US006236763B1

United States Patent
Wong et al.

(10) Patent No.: US 6,236,763 B1
(45) Date of Patent: May 22, 2001

(54) METHOD AND APPARATUS FOR REMOVING NOISE ARTIFACTS IN DECOMPRESSED VIDEO SIGNALS

(75) Inventors: Yiwan Wong, Dallas, TX (US); Hirohisa Yamaguchi, Tsukuba (JP)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/153,666

(22) Filed: Sep. 15, 1998

Related U.S. Application Data

(60) Provisional application No. 60/059,311, filed on Sep. 19, 1997.

(51) Int. Cl.[7] ............................. G06K 9/40; G06T 5/00
(52) U.S. Cl. ................................. 382/261; 382/275
(58) Field of Search ............................ 382/260, 262, 382/264, 225, 205, 232, 233, 236, 238, 239, 243, 261, 265, 274, 279, 275; 348/607, 618, 619

(56) References Cited

U.S. PATENT DOCUMENTS

| | | | |
|---|---|---|---|
| 5,850,294 | * 12/1998 | Apostolopoulos et al. | 382/260 |
| 5,852,475 | * 12/1998 | Gupta et al. | 382/205 |
| 5,920,356 | * 7/1999 | Gupta et al. | 382/264 |

* cited by examiner

Primary Examiner—Scott Rogers
(74) Attorney, Agent, or Firm—Wade James Brady, III; Frederick J. Telecky, Jr.

(57) ABSTRACT

A method of and circuitry for removing noise artifacts in decompressed video signals. A group of pixels is selected from a larger matrix of pixels from adjacent rows and columns of the matrix. A plurality of different subgroups of the group of pixels is selected, each subgroup including the same centrally located pixel. The maximum energy intensity difference emanating from each pixel in each of the subgroups is measured and the maximum difference among the pixels in each subgroup is determined. The subgroup having the lowest maximum difference is selected and the weighed mean of the selected pixels in the subgroup is computed with weights chosen to provide more significance to pixels which are located closer to the centrally located pixel. The centrally located pixel is then filtered with a linear filter, the coefficients of which are determined by the sum of absolute differences between the weighed mean and the pixels in the subgroup. Output from this linear filter is then conditionally filtered by linear filters of fixed coefficients in the vertical and horizontal directions to provide the final filtered version of the centrally located pixel. The subgroups include an odd number of rows and columns. The subgroups preferably include a first and second subgroups extending along each diagonal, a third subgroup extending along a single column and each of the rows, a fourth subgroup extending along a single row and each of the columns and a fifth subgroup surrounding the centrally located pixel.

24 Claims, 2 Drawing Sheets

METHOD AND APPARATUS FOR REMOVING NOISE ARTIFACTS IN DECOMPRESSED VIDEO SIGNALS

This application claims priority under 35 USC 119(e)(1) of provisional application Ser. No. 60/059,311 filed Sep. 19, 1997.

BACKGROUND OF THE INVENTION

1. Field of the Invention

This invention relates to a computer controlled filter system and pipeline architecture to detect and remove noise artifacts in signals in real time, primarily but not limited to video signals.

2. Brief Description of the Prior Art

Advances in technology have made it possible to store electrical signals and primarily electrical video signals digitally, such as on a compact disk (CD) read only memory (ROM). For many purposes, in order to store a sufficient amount of digital information on a CD ROM, it is generally necessary to compress the digital data. This is accomplished by removing data which is unnecessary or redundant as well as removing data which will not dramatically affect the quality of the reproduced video and/or audio, it being understood that the term "quality" can vary in accordance with personal desires or specified requirements. At present, data can be extracted from a CD ROM at a maximum data rate of about 1.5 megabits per second. This is a very low data rate and is generally insufficient for providing acceptable quality live video. For this reason, even with the most advanced compression techniques presently available, noise is introduced into the decompressed signal. This noise or picture degradation, in part, appears as fuzziness along the edges of the moving objects in the picture. Therefore, in order to improve the quality of the picture and/or sound, it is necessary to filter the decompressed signals by identifying and eliminating or minimizing the amount of noise causing the picture and/or sound degradation. This has presented a problem in the prior art.

SUMMARY OF THE INVENTION

The above described problem is minimized in accordance with the present invention.

Briefly, to filter noise from a display having a pixel matrix of x rows and y columns of pixels, initially a small subgroup of a matrix of pixels from m rows and n columns of the x rows and y columns, the rows and columns preferably being consecutive and odd in number, are chosen from the matrix. These m×n pixels are sampled in a number of different configurations, all of which include the same center pixel with each configuration preferably including the same number of pixels. The configurations preferably extend in as many different directions as possible such as, for example, each diagonal, a vertical line through the center pixel of the chosen pixels, a horizontal line through the center pixel of the chosen pixels and the center pixel and the four pixels on the vertical and horizontal lines therethrough which are immediately adjacent the center pixel, it being understood that other possible configurations are also acceptable and form a part of this invention. After the first m×n pixels are tested in a manner to be described hereinafter, the testing procedure moves over one column and selects the m×n pixels from the same m rows and columns numbered one pixel over (n+1), this being repeated until all of the columns have been reached and included in the testing. Thereafter the testing will select the first n columns and m rows starting with the row numbered one pixel down (m+1) and proceed across the columns in the same manner as described above until the last column has been reached. The test procedure then selects the first n columns and rows starting with the row numbered two pixels down (m+2) and continues in this manner until the last row has been reached. At this point in time there is adequate compensation for each of the pixels of the matrix except possibly for a small fringe about the perimeter of the matrix. All of the data obtained from this testing procedure is stored.

The testing procedure consists of four steps: finding the direction of minimal noise, mosquito noise filtering, vertical noise filtering, and horizontal noise filtering. After the configurations to be tested are chosen, the direction which has the minimum noise content is determined by finding the intensity contrast (IC) in each of the configuration directions. This is accomplished by testing each of the configurations and determining which of the configurations has the minimum intensity contrast (difference between maximum and minimum pixel values in the configuration). The configuration having the minimum intensity contrast is the one of minimum noise. If it is assumed that each configuration has (2k+1) pixels characterized as $t_1, t_2, \ldots t_k$, P (the center pixel of the configuration), $t_{k+1}, t_{k+2}, \ldots t_{2k}$, the intensity contrast of configuration i is determined as:

$$IC(i) = \max(t_1, t_2, \ldots, p, \ldots, t_{2k-1}, t_{2k}) - \min(t_1, t_2, \ldots, p, \ldots, t_{2k-1}, t_{2k}).$$

i.e., IC(i)=maximum pixel difference in configuration i. The configuration with the minimum IC value (called $IC_m$) is selected, that is, $IC_m$=minimum (IC(1), IC(2), IC(3), . . . ). A weighed mean (WM) of the pixels in this configuration of minimum intensity contrast $IC_m$ is then computed. The weighed mean can be computed by, for example, using the equation:

$$WM = (t_1 \times w_1 + t_2 \times w_2 + \ldots + p \times w_p + \ldots + t_{2k} \times w_{2k}) \div (w_1 + w_2 + \ldots + w_p + \ldots + w_{2k})$$

where $(w_1, w_2, \ldots, w_p, \ldots, w_{2k})$ are the (2k+1) weights used in computing WM. The weights should be chosen such that pixels closer to the center pixel p will use higher weights and those which are farther away from p will use lower weights. The sum of the absolute value of the difference (SA) between the weighed mean (WM) and the pixels in the selected configuration is computed by:

$$SA_m = abs(WM - t_1) + abs(WM - t_2) + \ldots + abs(WM - p) + \ldots + abs(WM + t_{2k})$$

where abs(x) is the absolute value of x. The same formula can be used to compute SA value for other configurations (e.g., SA(1) for configuration 1, SA(2) for configuration 2, etc.).

The $SA_m$ value is then saturated to an 8 bit quantity (i.e., if $SA_m$ is larger than 255, then it is set to 255) followed by a right-shift of three bits (equivalent to divide by 8) to provide a five bit value which ranges from 0 to 31. The resulting value is then used as an index to fetch one of the 32 filter coefficient pairs from a filter coefficient table. The jth row in the filter coefficient table contains the values (qtabP(j), qtabP_ml(j)). The values of qtabp() and qtabP_13 ml() are shown in the following Table:

| qtabP() | qtabP_m1() |
|---|---|
| 0.00000000 | 1.00000000 |
| 0.00000000 | 1.00000000 |
| 0.00000000 | 1.00000000 |
| 0.00000000 | 1.00000000 |
| 0.00000000 | 1.00000000 |
| 0.16406250 | 0.83593750 |
| 0.40625000 | 0.59375000 |
| 0.55859375 | 0.44140625 |
| 0.65625000 | 0.34375000 |
| 0.72656250 | 0.27343750 |
| 0.77734375 | 0.22265625 |
| 0.81640625 | 0.18359375 |
| 0.84375000 | 0.15625000 |
| 0.86718750 | 0.13281250 |
| 0.88281250 | 0.11718750 |
| 0.89843750 | 0.10156250 |
| 0.91015625 | 0.08984375 |
| 0.92187500 | 0.07812500 |
| 0.92968750 | 0.07031250 |
| 0.93750000 | 0.06250000 |
| 0.94140625 | 0.05859375 |
| 0.94921875 | 0.05078125 |
| 0.95312500 | 0.04687500 |
| 0.95703125 | 0.04296875 |
| 0.96093750 | 0.03906250 |
| 0.96093750 | 0.03906250 |
| 0.96484375 | 0.03515625 |
| 0.96875000 | 0.03125000 |
| 0.96875000 | 0.03125000 |
| 0.97265625 | 0.02734375 |
| 0.97265625 | 0.02734375 |
| 0.98046875 | 0.01953125 |

Note that qtabP(j)+qtabP$_{13}$ ml(j)=1.0 for all j. These selected filter coefficients (suppose the jth row has been selected) are used as filter coefficents in the mosquito noise filter which filters the center pixel p by providing an output MFout, where $$MFout = qtabP(j)*p + qtabP_{13}ml(j)*WM.$$

The output of the mosquito filter is then filtered by a vertical cross filter which, if turned on by the cross$_{13}$ V$_{13}$ on signal, provides an output VFout, where $$VFout = (3*MFout + Vavg)/4,$$

and Vavg=average of the neighboring pixels of p in the vertical configuration. If the vertical cross filter is not turned on (the control signal cross$_{13}$ V$_{13}$ on is off), then $$VFout = MFout.$$

If the control signal cross$_{13}$ H$_{13}$on is on, then HFout, the output of the horizontal cross filter, is $$HFout = (3*VFout + Havg)/4,$$

otherwise $$HFout = VFout,$$

where Havg=average of the neighboring pixels of p in the horizontal configuration. HFout is the filtered version of p and it is the output. The control signals cross$_{13}$ V$_{13}$ on and cross$_{13}$ H_on are determined as follows:

Let SAmax be the maximum SA values among all the configurations considered. Then the value of the parameter cross_threshold is:

| 10 | if SAmax ≤ 8 |
|---|---|
| 1.5*SAmax | if 8 < SAmax ≤ 40 |
| 55 | if 40 < SAmax |

Then signal cross_V_on is turned on if the SA value of the vertical configuration is less than or equal to cross_threshold. Likewise, the signal cross_H_on is on if the SA value of the horizontal configuration is less than or equal to cross_threshold.

DESCRIPTION OF THE PREFERRED EMBODIMENT

To filter noise from a display having a matrix of pixels with, for example, 352 rows and 240 columns, initially a group of pixels are chosen from the matrix from rows 1 to 5 and columns 1 to 5 to provide 25 chosen pixels as shown in FIG. 1(a) to 1(e). These 25 chosen pixels, of which only 17 are actually used as is evidenced from the number of different darkened pixels in FIGS. 1(a) to 1(e), are sampled in the 5 different configurations as shown in FIGS. 1(a) to (e), with each configuration including 5 pixels. The configurations as exemplary chosen are each diagonal as shown in FIGS. (1a) and (1c), a vertical line through the center pixel as shown in FIG. (1b), a horizontal line through the center pixel as shown in FIG. (1d) and the center pixel and the four immediately adjacent pixels on the vertical and horizontal lines therethrough as shown in FIG. (1e).

Figure 2:
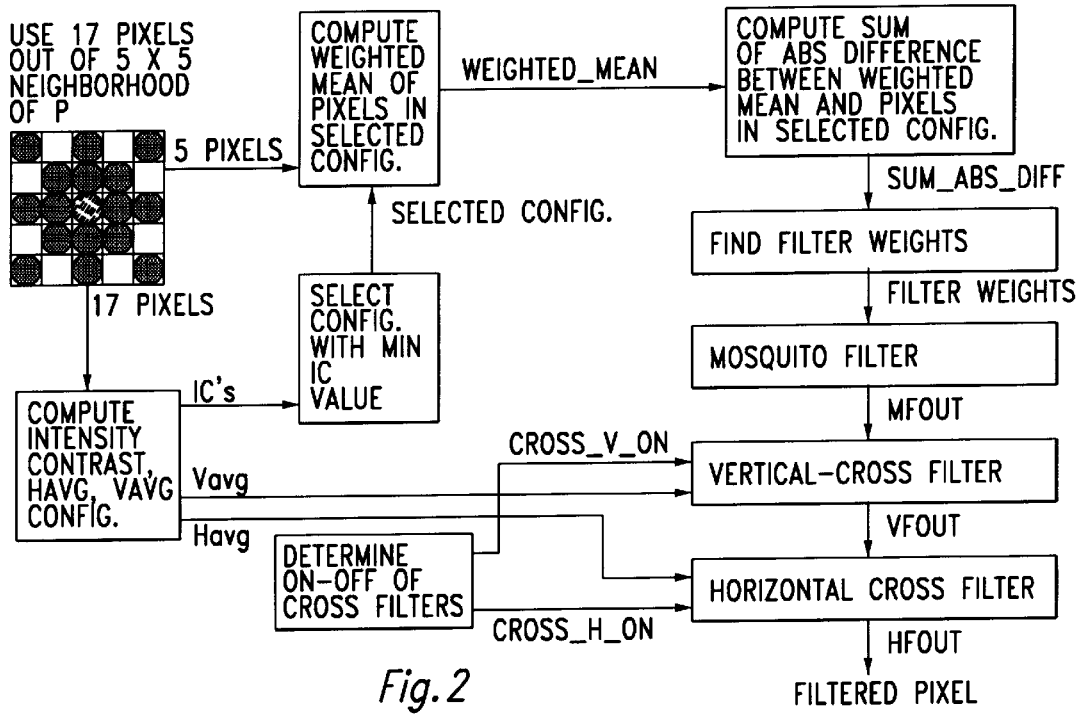
FIG. 2 is a top level data flow structure in accordance with the present invention.

The first 25 pixels are then tested as shown in the flow diagram of FIG. 2, the intent being to locate the direction from the center pixel of the configuration which has the minimum noise content. This is accomplished by testing each of the five chosen configurations of 5 pixels to determine the configuration which has the minimum intensity contrast (IC), where intensity contrast is defined as the difference between the maximum and minimum pixel values in the configuration.

The configuration with the minimum IC value has the minimum noise content. If it is assumed that each configuration has five pixels characterized as t1, t2, p (the center pixel of the configuration), t3 and t4, the intensity contrast being determined in a direction i, IC(i), is:

$$IC(i) = max(t2, t2, p, t3, t4) - min(t1, t2, p, t3, t4).$$

Hence, IC(1)=intensity contrast value in direction (a) in FIG. 1, IC(2)=intensity contrast value in direction (b) in FIG. 1, etc. The direction with the minimum intensity contrast value (called IC$_m$) is selected, that is $$IC_m = minimum\ (IC(1), IC(2), IC(3), IC(4), IC(5)).$$

The utilized pixels from that configuration are assigned weights proportional to their distance from the center pixel, and a weighed mean (WM) of these pixels is computed. The weighed mean is computed using the equation set forth above, with weights chosen as follow:

$$w_1=1, w_2=2, w_p=2, w_3=2, \text{and } w_4=1.$$

Figure 3:
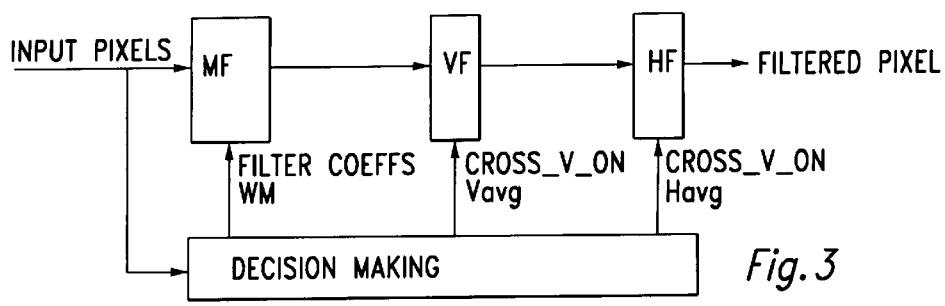
FIG. 3 is a block diagram showing the filter arrangement in accordance with the present invention.

The sum of the absolute value of the difference (SA) between the weighed mean (WM) and the pixels in the selected configuration is computed in the manner set forth above. The filter coefficients are then determined in the manner set forth above using the saturated and shifted SA value of the selected configuration and the filter coefficient table shown above. The filter coefficient table shown has been optimized to balance the noise reduction capability and feature retention characteristics of the filter. The filter coefficients are then used by the mosquito filter (MF in FIG. 3) which filters the center pixel p by providing an output $$MFout=qtabP(j)*p+qtabP_{13}ml(j)*WM.$$

Figure 1A:
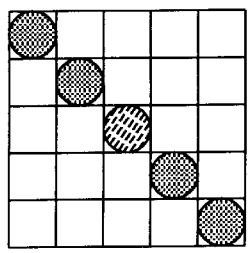
FIGS. 1(a) to 1(e) are schematic diagrams of five pixel neighborhoods which can be considered for the best filtering configuration with the center pixel being the pixel p in accordance with the present invention.
Figure 1B:
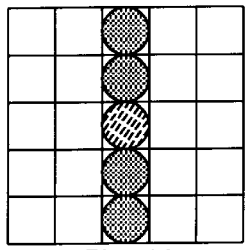
Figure 1C:
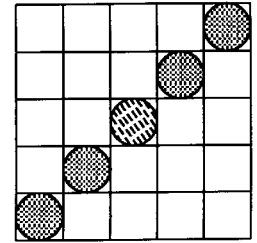

The output of the mosquito filter is then filtered by a vertical cross filter (VF in FIG. 3) which, if turned on by the $cross_{13}V\_on$ signal, provides an output $$VFout=(3*MFout+Vavg)/4,$$

where Vavg=average of the four neighbors of p in the vertical configuration (FIG. 1(b)). If the vertical cross filter is not turned on (that is, if $cross_{13}$ V_on is off) then $$VFout=MFout.$$

Figure 1D:
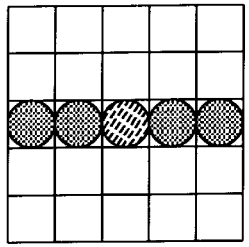
Figure 1E:
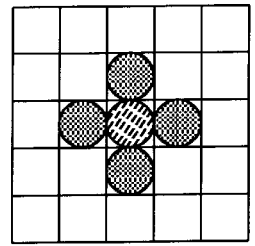

If the control signal $cross_{13}$ H_on is on, then HFout, the output of the horizontal cross filter (HF of FIG. 3) is $$HFout=(3*VFout+Havg)/4,$$

otherwise $$HFout=VFout,$$

where Havg=average of the four neighbors of p in the horizontal configuration (FIG. 1(d)) HFout is the filtered version of p and it is the output. The control signals cross_V_on and cross_$H_{13}$ on are determined in the block cross-filter-on-off in FIG. 3, in the manner set forth above.

After the first 25 pixels are tested in a manner described above, the testing procedure moves over one column and selects the 25 pixels from rows 1 to 5 and columns 2 to 6, etc. until column 240, the last column, is included in the testing. Thereafter the testing will include rows 2 to 6 and proceed across the columns in the same manner as described above until column 240 has been reached. The test procedure then goes to rows 3 to 7 and scans across to column 240, etc. until row 352, the last row, has been reached. At this point in time there is adequate compensation for each of the pixels of the matrix except possibly for a small fringe about the perimeter of the matrix. All of the data obtained from this testing procedure is stored.

Figure 4:
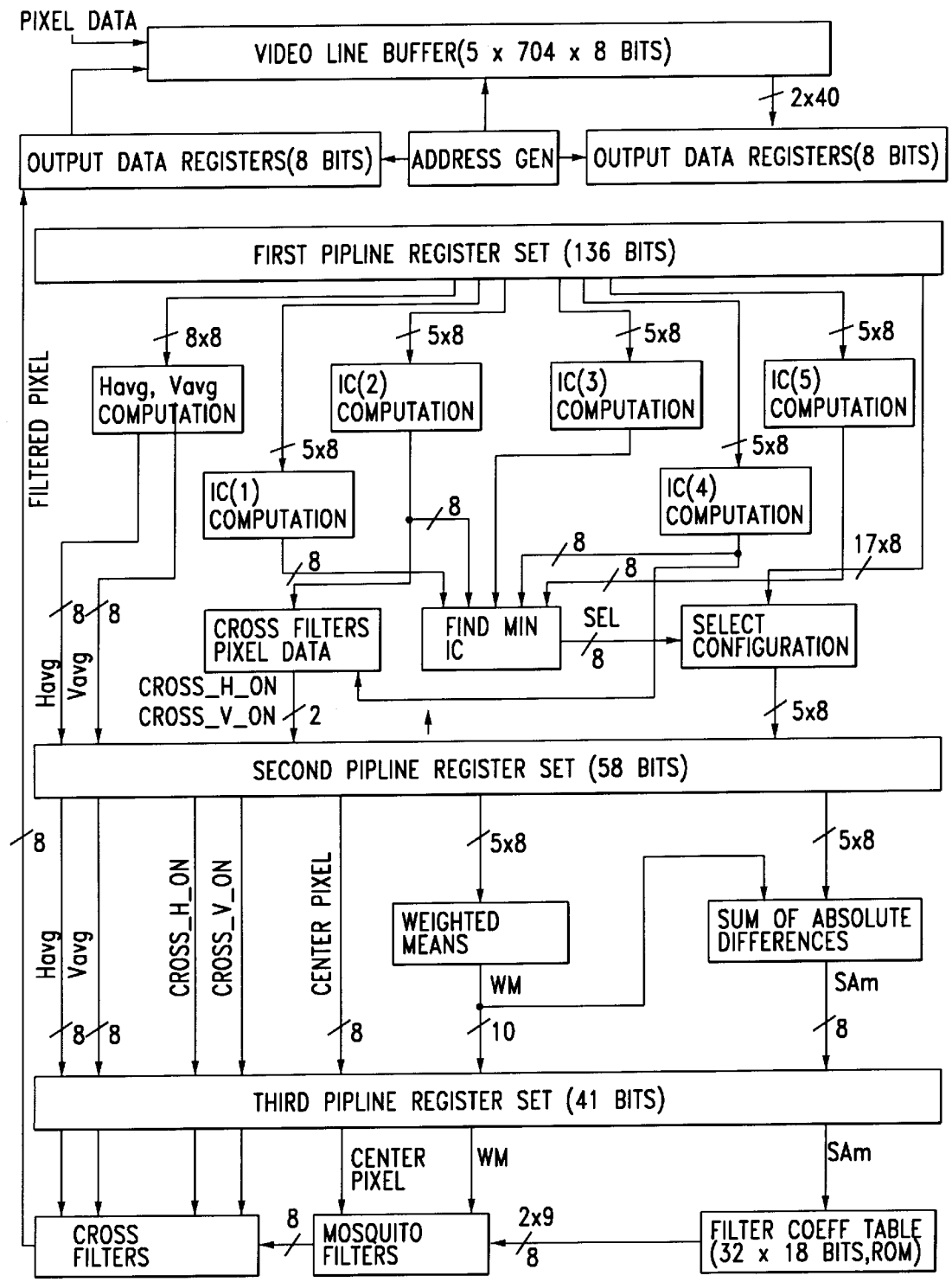
FIG. 4 is a schematic diagram of a pipeline architecture which can be used in accordance with the present invention.

FIG. 4 shows a pipeline architecture which can be used to realize the preferred embodiment. Pixels belonging to the different configurations are first loaded from the line buffer into the first pipeline register set. Pixel data of the individual configurations are then fed to the blocks labeled IC(1) to IC(5) to compute the intensity contrast values. The block labeled 'find-min-IC' determines the configuration which has the minimum IC value. The result from this block is then used by the block labeled 'selected configuation' to fetch the pixels of the selected configuration, and by the block labeled 'cross-filter on-off control' to compute the cross_V_on and cross_H_on control signals. The block labeled 'find-Havg-Vavg' computes the average values of the neighboring pixels of p in the horizontal and vertical configurations. Output values from the computation performed in this pipeline stage: Havg, Vavg, cross_V_on, cross_H_on, and the five selected pixels are then stored in the second pipeline register set.

The second pipeline stage receives data from the second pipeline register set, computes the SA value of the five selected pixels in the block labeled 'sum-of-absolute-difference' using the weighed mean WM computed by the block labeled 'weighed mean'. Output from this pipeline stage: saturated and shifted $SA_m$, WM, Havg, Vavg, center pixel p, cross_V_on, and cross_H_on are stored in the third pipeline register set.

The third pipeline stage receives data from the third pipeline register set, looks up the filter coefficents from the table labeled 'filter-coeff-table' using the saturated-shifted $SA_m$. These filter coefficients are then used by the block 'mosquito filter' to compute MFout from the center pixel p. MFout is then fed into the block 'cross filter' which uses cross_V_on and cross H on to turn on or off respectively the vertical and the horizontal cross filter to compute the value of VFout and HFout. The output HFout is then written to the output data register as the filtered value of the center pixel p.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A method of removing noise artifacts in decompressed video signals which comprises the steps of:
    (a) selecting a group of pixels from a larger matrix of pixels from adjacent rows and columns of said matrix;
    (b) selecting a plurality of different subgroups of said group of pixels, each said subgroup including at least one pixel from each of at least three of said rows or columns and including the same centrally located pixel;
    (c) measuring the intensity of the energy emanating from each pixel in each of said subgroups;
    (d) determining the maximum difference in energy among the pixels in each said subgroup and selecting the subgroup having the lowest maximum difference;
    (e) weighting said centrally located pixel and the neighboring pixels in said selected subgroup to provide more significance to the closer neighbors in computing a weighed mean value;
    (f) computing said weighed mean value; and
    (g) filtering the centrally located pixel based on said weighted mean value.

2. The method of claim 1 wherein said step of filtering the centrally located pixel includes the step of filtering with a linear filter, the coefficients of which are determined by the sum of absolute differences between the weighed mean and the pixels in the said subgroup.

3. The method of claim 1 further including the step of filtering the output from (g) with a linear filter of fixed coefficients and the average intensity of the neighboring pixels in the vertical direction.

4. The method of claim 1 further including the step of filtering the output from (g) with a linear filter of fixed coefficients and the average intensity of the neighboring pixels in the horizontal direction.

5. The method of claim 2 further including the step of filtering the output from (g) with a linear filter of fixed coefficients and the average intensity of the neighboring pixels in the horizontal direction.

6. The method of claim 3 further including the step of filtering the filtered output from (g) with a linear filter of fixed coefficients and the average intensity of the neighboring pixels in the horizontal direction.

7. The method of claim 1 wherein said subgroup includes an odd number of rows and an odd number of columns.

8. The method of claim 2 wherein said subgroup includes an odd number of rows and an odd number of columns.

9. The method of claim 3 wherein said subgroup includes an odd number of rows and an odd number of columns.

10. The method of claim 4 wherein said subgroup includes an odd number of rows and an odd number of columns.

11. The method of claim 5 wherein said subgroup includes an odd number of rows and an odd number of columns.

12. The method of claim 6 wherein said subgroup includes an odd number of rows and an odd number of columns.

13. The method of claim 1 wherein said subgroups include at least two of a first subgroup extending along a diagonal in a first direction, a second subgroup extending along a diagonal in a second direction different from said first direction, a third subgroup extending along a single column and each of said rows, a fourth subgroup extending along a single row and each of said columns and a fifth subgroup surrounding said centrally located pixel.

14. The method of claim 2 wherein said subgroups include at least two of a first subgroup extending along a diagonal in a first direction, a second subgroup extending along a diagonal in a second direction different from said first direction, a third subgroup extending along a single column and each of said rows, a fourth subgroup extending along a single row and each of said columns and a fifth subgroup surrounding said centrally located pixel.

15. The method of claim 3 wherein said subgroups include at least two of a first subgroup extending along a diagonal in a first direction, a second subgroup extending along a diagonal in a second direction different from said first direction, a third subgroup extending along a single column and each of said rows, a fourth subgroup extending along a single row and each of said columns and a fifth subgroup surrounding said centrally located pixel.

16. The method of claim 4 wherein said subgroups include at least two of a first subgroup extending along a diagonal in a first direction, a second subgroup extending along a diagonal in a second direction different from said first direction, a third subgroup extending along a single column and each of said rows, a fourth subgroup extending along a single row and each of said columns and a fifth subgroup surrounding said centrally located pixel.

17. The method of claim 6 wherein said subgroups include at least two of a first subgroup extending along a diagonal in a first direction, a second subgroup extending along a diagonal in a second direction different from said first direction, a third subgroup extending along a single column and each of said rows, a fourth subgroup extending along a single row and each of said columns and a fifth subgroup surrounding said centrally located pixel.

18. The method of claim 8 wherein said subgroups include at least two of a first subgroup extending along a diagonal in a first direction, a second subgroup extending along a diagonal in a second direction different from said first direction, a third subgroup extending along a single column and each of said rows, a fourth subgroup extending along a single row and each of said columns and a fifth subgroup surrounding said centrally located pixel.

19. The method of claim 10 wherein said subgroups include at least two of a first subgroup extending along a diagonal in a first direction, a second subgroup extending along a diagonal in a second direction different from said first direction, a third subgroup extending along a single column and each of said rows, a fourth subgroup extending along a single row and each of said columns and a fifth subgroup surrounding said centrally located pixel.

20. The method of claim 12 wherein said subgroups include at least two of a first subgroup extending along a diagonal in a first direction, a second subgroup extending along a diagonal in a second direction different from said first direction, a third subgroup extending along a single column and each of said rows, a fourth subgroup extending along a single row and each of said columns and a fifth subgroup surrounding said centrally located pixel.

21. A method of removing noise artifacts in decompressed video signals which comprises the steps of:

(a) providing a display having a matrix of pixels;

(b) selecting a first subgroup of said pixels having a centrally located pixel;

(c) finding the direction of minimal noise in said first subgroup of pixels by measuring the intensity of energy from a plurality of different groups of pixels of said subgroup including said centrally located pixel;

(d) providing a plurality of filters for filtering said energy from said pixels;

(e) providing a filter coefficient table for providing coefficients for said filters, said coefficients being determined by said determined direction of minimum travel;

(f) weighting each of said filters in accordance with said direction of minimum noise using said filter coefficient table;

(g) filtering the energy from the pixels in said subgroup of pixels with at least one of said weighted filters;

(h) selecting a second subgroup of said pixels different from said first subgroup; and (I) repeating steps (c) through (f).

22. The method of claim 21 wherein said direction of minimal noise is determined by locating the group of said subgroup having the minimum difference in intensity of energy between the pixel of greatest intensity and the pixel of least intensity in said group.

23. The method of claim 21 wherein said plurality of filters includes each of a mosquito filter, a vertical cross filter and a horizontal cross filter.

24. The method of claim 22 wherein said plurality of filters includes each of a mosquito filter, a vertical cross filter and a horizontal cross filter.

* * * * *